Sept. 16, 1969   N. G. JOHNSSON   3,467,169

METHOD AND MEANS FOR CASTING OF BEARING METAL TO BEARINGS

Filed Aug. 21, 1967

INVENTOR.
Nils Gustan Johnsson
BY Pierce, Scheffler & Parker
his Attorneys

Patented Sept. 16, 1969

3,467,169
METHOD AND MEANS FOR CASTING OF BEARING METAL TO BEARINGS
Nils Gustav Johnsson, Kullavik, Sweden, assignor to Aktiebolaget Gotaverken, Goteborg, Sweden, a corporation of Sweden
Filed Aug. 21, 1967, Ser. No. 662,079
Claims priority, application Sweden, Oct. 17, 1966, 14,040/66
Int. Cl. B22d *19/08, 13/04, 13/10*
U.S. Cl. 164—98            4 Claims

ABSTRACT OF THE DISCLOSURE

The application by means of centrifugal casting of bearing metal to bearing bodies, the shape of which deviates from that of a simple half-cylinder ring by having certain portions of its axial edges recessed below a plane through the centrum axis of the cylinder ring, is faciliated by the use of a sealing block, the size of which is bigger than the opening composed of two juxtaposed recesses, which is formed when two similar bearing bodies are placed in mirror image position and secured together. The block is fitted from inside the unit and is retained in the opening by suitable means.

BACKGROUND OF THE INVENTION

The application of bearing metal to the surface of a bearing body, the shape of which deviates from that of a simple half-cylinder ring, such as is found at the lower part of a crosshead bearing, has hitherto met certain difficulties. These recesses in the bearing bodies have hitherto made it impossible to apply the bearing metal by means of centrifugal casting, and it has usually been necessary to cast the bearings in a die, where the bearing body has been arranged with the centrum axis vertically. The body must be heated thoroughly before the bearing metal is poured into the die, but nevertheless many rejections are encountered. This is due to the fact, that the bearing metal will not adhere properly to the bearing body, especially in the part of the bearing, which is lowermost during the casting operation.

SUMMARY OF THE INVENTION

The present invention referes to a method and a means by which it is possible to apply the bearing metal by centrifugal casting. A method according to the invention is characterized by mounting and securing two similar bearing bodies in mirror image position to form a cylinder ring unit, putting a sealing block, the size of which is somewhat larger than the opening composed of two such recesses in the meeting edges of the two bodies from inside the cylinder ring against said opening, securing the block in said position, placing the complete unit in a centrifugal casting machine of arbitrary known design provided with covers to close the end openings in the cylinder ring unit, and supplying molten bearing metal while rotating the unit.

DESCRIPTION OF THE PREFERRED EMBODIMENT

Figure 1:
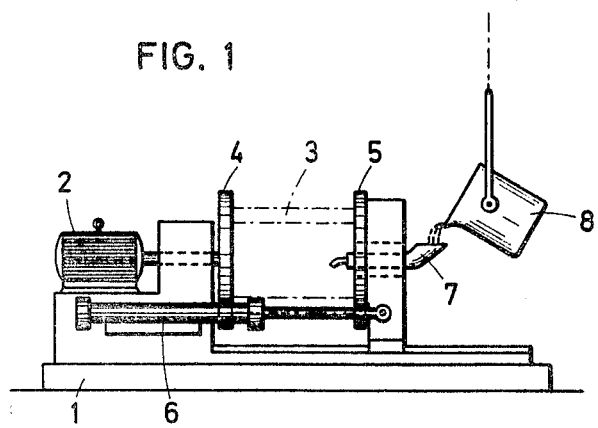
FIGURE 1 shows a centrifugal casting machine of well-known design.
Figure 2:
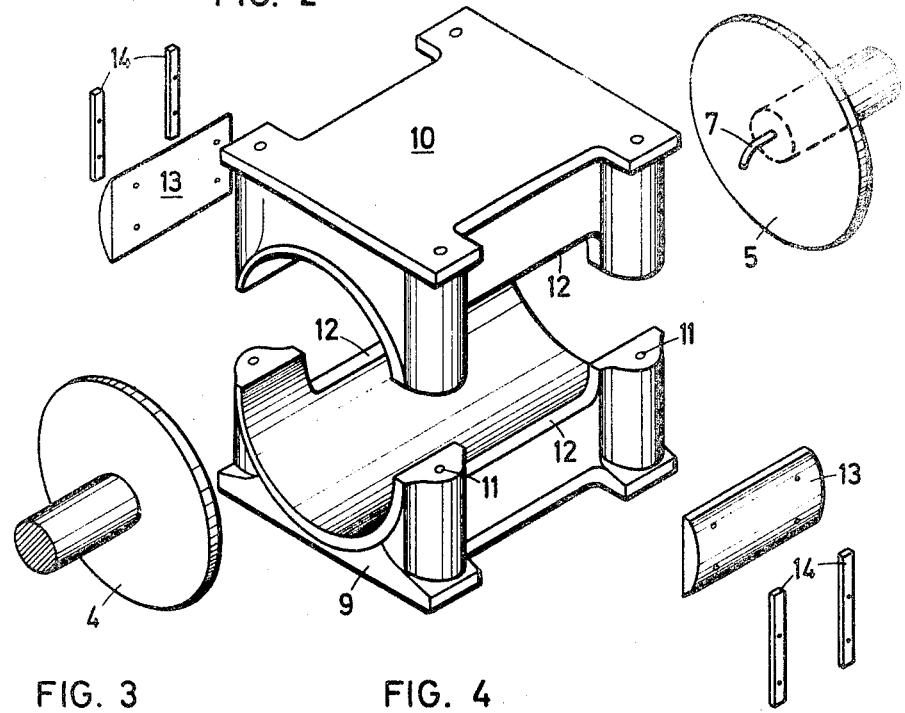
FIGURE 2 shows an exploded view of the parts having direct connection with the working of the invention.
Figure 3:
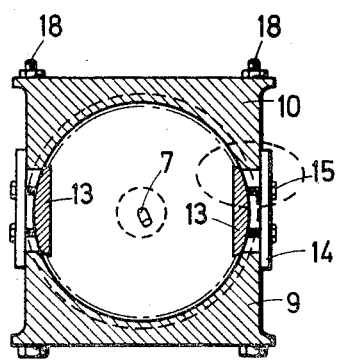
FIGURE 3 is a section through two bearing bodies as mounted in the centrifugal casting machine.
Figure 4:
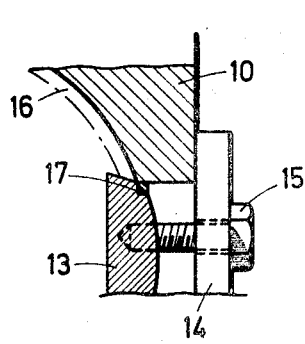
FIGURE 4 shows a detail on a large scale of the portion encircled in dash lines in FIGURE 3.

The centrifugal casting machine of FIGURE 1 is of arbitrary well-known design and consists of a bed 1 carrying an electric motor adapted to rotate a unit 3 to be treated during the casting operation. The machine contains two end covers 4 and 5, of which the latter one is adapted to be pulled towards the former one, 4, by means of hydraulic rams 6, thereby tightly clamping the unit in position between the end covers.

The non-rotating central portion of the end cover 5 is provided with a spout 7 through which molten metal from a ladle 8 may be poured into the unit, while this is rotating.

The unit to be treated consists in this case of two similar bearing bodies 9 and 10 each adapted to form the lower portions of a crosshead bearing for a large internal combustion engine. These bearing bodies are mounted one upon the other in mirror image position. The bearing bodies are provided with holes 11, into which normally bolts for connecting the bearing body to the connecting rod are located. These holes are now utilized to accommodate bolts 18, by means of which the two bearing bodies are secured in an exact position in relation to each other, said bolts being sufficient strong to make it possible to run the unit in the centrifugal casting machine. Between the enlarged portions of the bearing body, where the holes are located, a recess 12 is arranged in each of the longitudinal edges of the bearing body. Said recess is adapted to accommodate the arm of the crosshead, and make possible the oscillating movement of the connecting rod in relation to the crosshead pin. When the two bearing bodies are arranged in the position indicated above, a rectangular opening will thus be formed at each side of the unit, and it is this opening which hitherto has made it impossible to apply the bearing metal by centrifugal casting. Into each opening a sealing block 13 is now arranged, the perimeter of which is somewhat larger than the internal perimeter of the opening. The sealing block is brought into position from inside of the bearing, and as it is larger than the opening, it will automatically be retained in the opening, when the unit is being rotated. In order to secure the block in the desired position during the mounting a number of locking members 14 are utilized, which in arbitrary manner by means of bolts 15 may be fitted to the blocks resting against the outside of the bearing bodies. The edge of the sealing block turned towards the bearing surface is somewhat thicker than the desired coating 16 of bearing metal. The internal surface of the sealing block is blackened or shaped in suitable manner to prevent the bearing metal to adhere thereto. In order to obtain a perfect sealing a packing 17 of aluminium or similar material, to which the bearing metal will not adhere, may be fitted in the recessed contact surface between the sealing block and the bearing bodies.

In this manner it will be possible to apply bearing metal by means of centrifugal casting, so that the metal will adhere uniformly all over the bearing surface. The sealing blocks will cover a narrow strip around the perimeter of the opening, but as this will be located in a part of the bearing, which is subjected to the lowest load, the loss of bearing surface is insignificant.

By varying the shape of the sealing blocks it is possible to apply bearing metal by means of centrifugal casting to bearing bodies of arbitrary shape deviating from that of a simple half-cylinder ring.

What I claim is:
1. A method for applying bearing metal to the surface of a bearing body, the shape of which deviates from that of a simple half-cylinder ring by having certain portions of its axial edges recessed below a plane through the centrum axis of the cylinder ring comprising the steps of;

mounting and securing two similar bearing bodies in mirror image position to form a cylinder ring unit;

putting a sealing block, the size of which is somewhat larger than the opening composed of two such recesses in the meeting edges of the two bodies from inside the cylinder ring, against said opening and securing it in said position;

placing the complete unit in a centrifugal casting machine of arbitrary known design provided with covers to close the end opening in the cylinder ring unit, and;

supplying molten bearing metal to said surface while rotating the unit.

2. An apparatus for applying bearing metal by centrifugal casting to the surface of a bearing body, especially a crosshead bearing, the shape of which deviates from that of a simple half-cylinder ring by having certain portions of its axial edges recessed below a plane through the centrum axis of the cylinder ring, comprising;

means for securing two similar bearing bodies in mirror image position;

at least one sealing block which is larger than the opening composed of two juxtaposed recesses which are formed in the meeting edges of the two bodies, said block being designed to be fitted against said opening from the inside of the cylinder ring;

means to secure said blocks in said opening in sealing engagement with the edges thereof;

means for clamping said bearing bodies between two end covers;

means for rotating said bearing bodies and end covers about a horizontal axis coincident with said centrum axis, and;

means for pouring molten metal onto said bearing bodies surfaces while they are rotating.

3. Apparatus according to claim 2 in which the edge portions of the sealing block are thicker than the desired thickness of the bearing metal coating.

4. Apparatus according to claim 2 in which the edge of the sealing block is stepped to accommodate a packing of heat resistant material resistant to the adhesion of the bearing metal.

References Cited

UNITED STATES PATENTS 2,047,588   7/1936   Ledeboer _____ 164—292
2,273,615   2/1942   Batie _____ 164—288 X J. SPENCER OVERHOLSER, Primary Examiner R. D. BALDWIN, Assistant Examiner U.S. Cl. X.R.

164—114, 288